(12) United States Patent
Kodama et al.

(10) Patent No.: US 8,854,767 B2
(45) Date of Patent: Oct. 7, 2014

(54) DISK DRIVE DEVICE

(71) Applicant: Samsung Electro-Mechanics Japan Advanced Technology Co., Ltd., Shizuoka (JP)

(72) Inventors: Mitsuo Kodama, Shizuoka (JP); Takanori Watanabe, Shizuoka (JP); Susumo Ando, Shizuoka (JP); Taketo Nonaka, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 13/855,489

(22) Filed: Apr. 2, 2013

(65) Prior Publication Data
US 2013/0342932 A1  Dec. 26, 2013

(30) Foreign Application Priority Data
Apr. 5, 2012 (JP) ................................. 2012-086448

(51) Int. Cl.
*G11B 17/02* (2006.01)

(52) U.S. Cl.
USPC ........................................................ 360/99.12

(58) Field of Classification Search
USPC ........................................................ 360/99.12
See application file for complete search history.

(56) References Cited

U.S. PATENT DOCUMENTS

| | | | | |
|---|---|---|---|---|
| 6,876,517 B2 * | 4/2005 | Sheu | ........................... | 360/99.12 |
| 7,602,583 B2 * | 10/2009 | Makita | ........................ | 360/99.12 |
| 7,715,146 B2 * | 5/2010 | Ng et al. | ..................... | 360/99.12 |
| 7,823,270 B2 * | 11/2010 | Choo et al. | .................. | 29/603.03 |
| 8,467,146 B2 * | 6/2013 | Jang et al. | .................. | 360/99.12 |

FOREIGN PATENT DOCUMENTS

| | | |
|---|---|---|
| JP | H04-061474 | 5/1992 |
| JP | 2011045234 A | 3/2011 |

* cited by examiner

*Primary Examiner* — Mark Blouin
(74) *Attorney, Agent, or Firm* — Blank Rome LLP

(57) ABSTRACT

A disk drive device comprises a rotor on which a recording disk is to be mounted and a fixed body rotatably supporting the rotor through a bearing unit. The rotor includes a projecting portion configured to fit into a central hole of the recording disk, a clamper configured to be fixed to the projecting portion, and a seating portion provided radially outward of the projecting portion. The projecting portion and the seating portion are configured such that the seating portion moves with respect to the projecting portion by fixing the clamper to the projecting portion with the recording disk being in between the clamper and the seating portion.

18 Claims, 6 Drawing Sheets

DISK DRIVE DEVICE

The present application claims the benefit of Japanese Patent Application No. 2012-086448 filed Apr. 5, 2012.

BACKGROUND OF THE INVENTION

1. Field of the Invention

The present invention relates to a disk drive device comprising a rotor on which a recording disk is to be mounted and a fixed body rotatably supporting the rotor through a bearing unit.

2. Description of the Related Art

Disk drive devices, such as hard disk drives, have become miniaturized. The capacity of a disk drive device has also been increased. Such disk drive devices have been installed in various types of electronic devices. In particular, such disk drive devices have been installed in portable electronic devices such as laptop computers or portable music players. In prior arts, a disk drive device described for example in Japanese Patent Application Publication No. 2011-045234 is proposed.

With regard to disk drive devices that are installed in portable electronic devices, their impact resistance has been required to be improved so that the disk drive devices can withstand impacts, such as those due to dropping, compared with the case of stationary electronic devices such as personal computers.

SUMMARY OF THE INVENTION

One of the methods for enlarging the recording capacity of a disk drive device is to narrow the width of a recording track and to position a magnetic head close to the surface of a magnetic recording disk. However, narrowing the gap between the magnetic head and the surface of the magnetic recording disk may cause a contact between the magnetic head and the magnetic recording disk due to, for example, impact. Narrowing the width of the recording track may cause disturbance of the trace of the recording track due to impact. These may increase read/write errors of data.

The present invention addresses at least the above disadvantages, and a general purpose of one embodiment of the present invention is to provide a disk drive device that can reduce adverse effect caused by impact.

An embodiment of the present invention relates to a disk drive device. The disk drive device comprises a rotor on which a recording disk is to be mounted and a fixed body rotatably supporting the rotor through a bearing unit. The rotor includes a projecting portion configured to fit into a central hole of the recording disk, a clamper configured to be fixed to the projecting portion, and a seating portion provided radially outward of the projecting portion. The projecting portion and the seating portion are configured such that the seating portion moves with respect to the projecting portion by fixing the clamper to the projecting portion with the recording disk being in between the clamper and the seating portion.

A further embodiment of the present invention relates to a disk drive device. The disk drive device comprises a rotor on which a recording disk is to be mounted and a fixed body rotatably supporting the rotor through a bearing unit. The rotor includes a projecting portion configured to fit into a central hole of the recording disk and a seating portion provided radially outward of the projecting portion. An engaging portion is formed on an outer surface of the projecting portion. The recording disk is fixed to the rotor by being in between a clamper engaged to the engaging portion and the seating portion.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

In a disk drive device in general, a hub on which a magnetic recording disk is mounted rotates with respect to a base. In the case where impact is applied to the disk drive device, the impact is transmitted from the base to the hub and from the hub to the magnetic recording disk. Under these circumstances, the present inventors have recognized that, by relatively softening the hub, it would be possible to give the hub a shock absorbing function against the impact.

However, if the hub is relatively soft, fixing the magnetic recording disk to the hub may cause a deformation of the hub. In particular in the case where the disk drive device is relatively thin, it is necessary to make the hub thin. This may increase the possibility of the hub being deformed. Here, if the disk drive device is designed under an assumption that the hub does not deform as in the prior art, a position of the magnetic recording disk after the magnetic recording disk is actually fixed to the hub may not be as desired.

Therefore, in the first embodiment of the present invention, the disk drive device is designed under an assumption that the hub deforms more or less. In particular, the shape of the hub and the elasticity of the hub are determined such that the deformation of the hub when the magnetic recording disk is fixed to the hub is taken into consideration. By doing so, even if the hub becomes thinner and softer by making the disk drive device thinner and improving the impact resistance, it is possible to keep the accuracy of the position of the magnetic recording disk high.

The First Embodiment

Figure 1A:
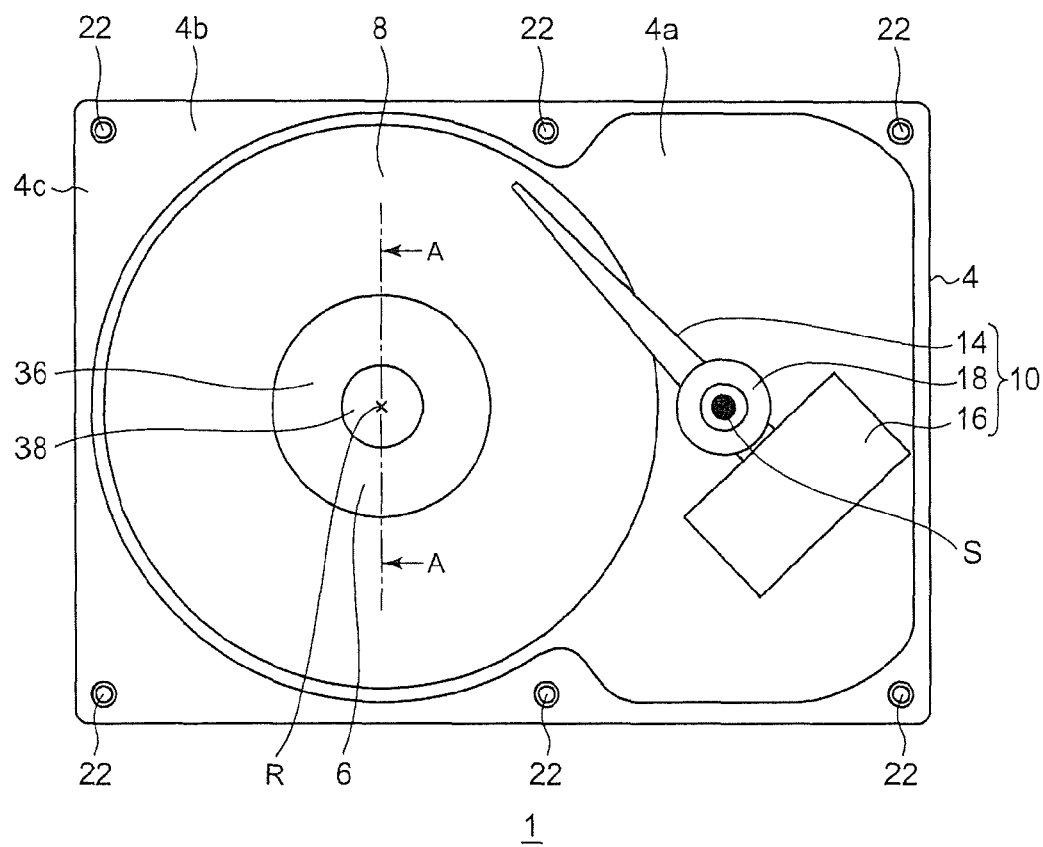
FIG. 1A and FIG. 1B are a top view and a side view of a disk drive device according to a first embodiment, respectively.
Figure 1B:
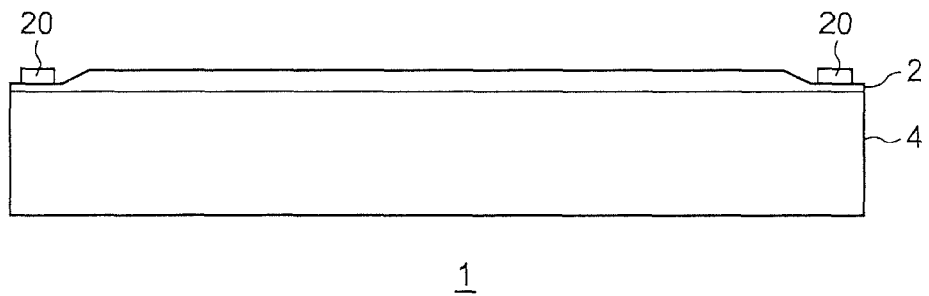

FIG. 1A and FIG. 1B are a top view and a side view, respectively, of the disk drive device 1 according to the first embodiment. FIG. 1A is the top view of the disk drive device 1. In FIG. 1A, the disk drive device 1 is shown without a top cover 2 in order to show the inside of the disk drive device 1. The disk drive device 1 comprises: a base 4; a rotor 6; a magnetic recording disk 8; a data read/write unit 10; and the top cover 2. The disk drive device 1 is a hard disk drive that rotates the magnetic recording disk 8. Hereinafter, it is assumed that the side of the base 4 on which the rotor 6 is installed is the "upper" side.

The magnetic recording disk 8 is a 2.5-inch type glass magnetic recording disk the diameter of which is 65 mm. The diameter of the central hole of the magnetic recording disk 8 is 20 mm. Thinning the magnetic recording disk 8 may cause reduction of stiffness. If the stiffness is reduced, the magnetic recording disk 8 may be warped in the process of polishing during manufacture; thereby flatness of the magnetic recording disk 8 may be deteriorated. On the other hand, thickening of the magnetic recording disk 8 may increase the weight of the magnetic recording disk 8. It is realized by the present inventors that the magnetic recording disk 8 with a thickness ranging from 0.5 mm to 1.25 mm is usable in terms of stiffness and weight. In the present embodiment, the thickness of the magnetic recording disk 8 ranges from 0.7 mm to 0.9 mm; thereby suppressing the reduction of flatness and reduction of recording density. The magnetic recording disk 8 is mounted on the rotor 6, and rotates with the rotor 6.

The base 4 is produced by die-casting an alloy of aluminum. The base 4 includes: a bottom plate 4a forming the bottom portion of the disk drive device 1; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b. The base 4 rotatably supports the rotor 6 through the bearing unit 12 which is not shown in FIG. 1A. The bearing unit 12 is a fluid dynamic bearing unit.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is the side view of the disk drive device 1. The top cover 2 is fixed onto the upper surface 4c of the outer circumference wall 4b of the base 4 using six screws 20. The six screws 20 correspond to the six screw holes 22, respectively. In particular, the top cover 2 and the upper surface 4c of the outer circumference wall 4b are fixed together so that the joint portion between both does not create a leak into the inside of the disk drive device 1.

Figure 2:
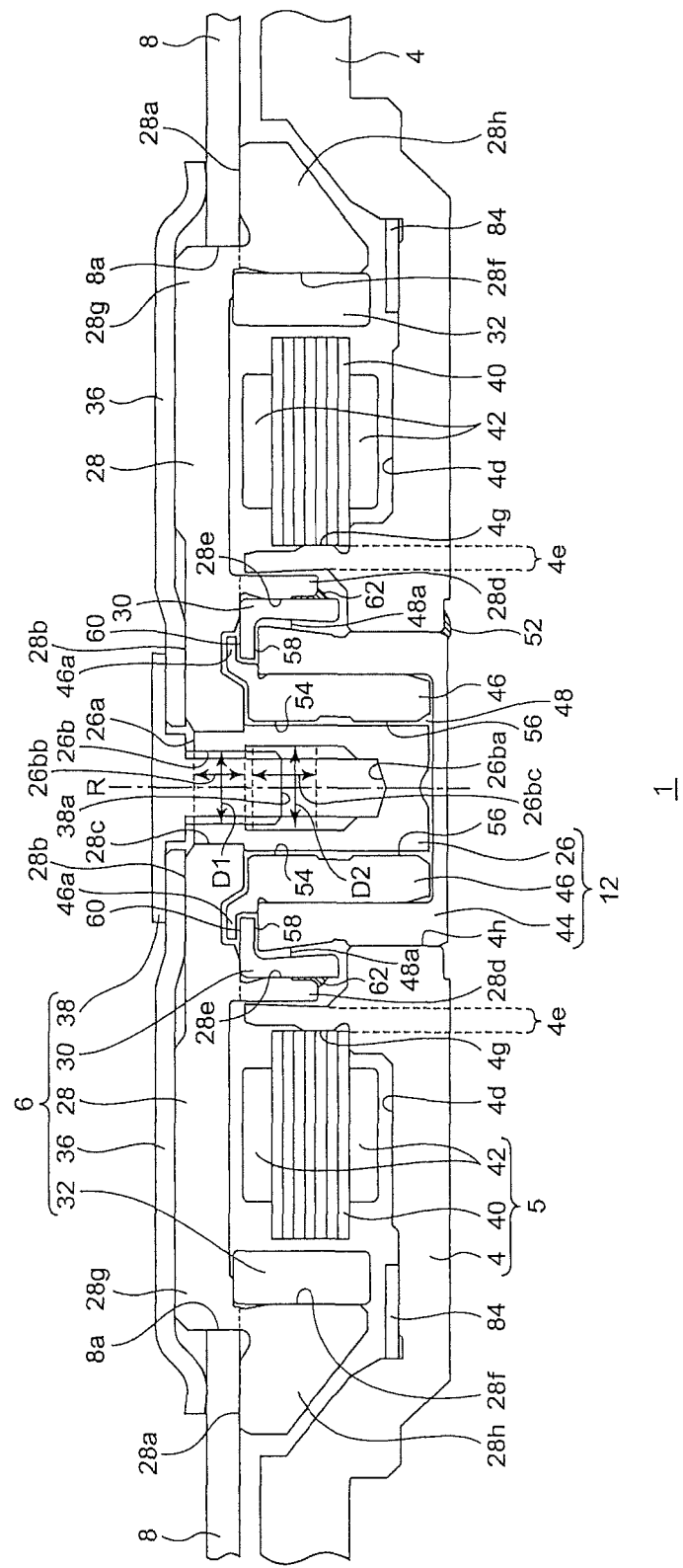
FIG. 2 is a section view sectioned along line A-A in FIG. 1A.

FIG. 2 is a view that is sectioned along the line A-A, as illustrated in FIG. 1A. The rotor 6 includes a hub 28, a flange 30, a cylindrical magnet 32, a clamper 36 and a screw 38 for affixing the disk.

The hub 28 is formed to be predetermined cup-like shape by cutting steel material like SUS430F. The hub 28 includes a projecting portion 28g fitting into the central hole 8a of the magnetic recording disk 8, a seating portion 28h provided radially outward of the projecting portion 28g, and a hanging portion 28d projecting downward from the lower surface of the projecting portion 28g and surrounding the bearing unit 12.

A shaft hole 28c is formed in the projecting portion 28g along the rotational axis R. The upper end of the shaft 26 is press-fit into the shaft hole 28c. This means that the surface of the shaft hole 28c is a contact portion between the shaft 26 and the hub 28 (i.e. the surface of the shaft hole 28c touches the shaft 26).

The magnetic recording disk 8 is seated on a disk-mount surface 28a which is an upper surface of the seating portion 28h. A concave portion or a screw hole 26b for affixing the disk is formed in the upper surface 26a of the shaft 26 along the rotational axis R of the rotor 6. The clamper 36 is pressed against the upper surface 28b of the projecting portion 28g by the screws 38 for affixing the disk, which are screwed in the corresponding screw hole 26b for affixing the disk. The clamper 36 presses the magnetic recording disk 8 against the disk-mount surface 28a. In that, the clamper 36 is fixed to the projecting portion 28g by screw.

The shape and the elasticity of the projecting portion 28g and the seating portion 28h are determined such that the seating portion 28h moves with respect to the projecting portion 28g by screwing down the clamper 36 to the projecting portion 28g with the magnetic recording disk 8 being in between the clamper 36 and the seating portion 28h.

The flange 30 is in ring-shape and has a reverse L-shaped cross section. The flange 30 is glued on an inner surface 28e of the hanging portion 28d using, for example, glue 62.

The cylindrical magnet 32 is glued on a cylindrical inner surface 28f of the seating portion 28h. The cylindrical magnet 32 is made of a rare-earth material such as Neodymium, Iron, or Boron. The cylindrical magnet 32 faces radially towards twelve teeth of the laminated core 40. The cylindrical magnet 32 is magnetized for driving, with sixteen poles along the circumferential direction (i.e. in a tangential direction of a circle the center of which is in the rotational axis R, the circle being perpendicular to the rotational axis R). The surface of the cylindrical magnet 32 is treated with electro deposition coating or spray coating to form a film on the surface. The film on the surface suppresses exfoliation of the surface of the magnet 32 or prevents the rust of the surface.

A fixed body 5 of the disk drive device 1 includes the base 4, a laminated core 40, coils 42 and a magnetic ring 84. The laminated core 40 has a ring portion and twelve teeth, which extend radially (i.e. in a direction perpendicular to the rotational axis R) outwardly from the ring portion, and is fixed on the upper surface 4d side of the base 4. The laminated core 40 is formed by laminating seven thin magnetic steel sheets and mechanically integrating them. An insulation coating is applied onto the surface of the laminated core 40 by electrodeposition coating or powder coating. Each of the coils 42 is wound around one of the twelve teeth, respectively. A driving flux is generated along the teeth by applying a three-phase sinusoidal driving current through the coils 42.

A ring-shaped wall 4e, the center of which is along the rotational axis R, is formed on the upper surface 4d of the base 4. The laminated core 40 is fitted to the outer surface 4g of the ring-shaped wall 4e with a press-fit or clearance fit and glued thereon. A through hole 4h, the center of which is along the rotational axis R, is formed on the base 4.

The magnetic ring 84 is arranged on the upper surface 4d of the base 4. The magnetic ring 84 faces, in an axial direction (i.e. a direction parallel to the rotational axis R), the cylindrical magnet 32. The magnetic ring 84 is manufactured by shaping a soft-magnetic material like a steel plate in the form of thin ring. The magnetic ring 84 is fixed (for example, glued or press-fit or mechanically integrated) on the upper surface 4d of the base 4, the magnetic ring 84 being substantially coaxial with the rotational axis R. The magnetic ring 84 may be fixed to the base 4 by mechanically attaching the side surface of the magnetic ring 84 to the base 4. By providing the magnetic ring 84, a magnetic suction force is applied to the cylindrical magnet 32, the force attracting the cylindrical magnet 32 towards the magnetic ring 84 (i.e. downward).

The bearing unit 12 includes the housing 44, the sleeve 46 and the shaft 26. The bearing unit 12 rotatably supports the rotor 6 with respect to the fixed body 5. The housing 44 is fixed (for example, glued) in the through hole 4h of the base 4. The housing 44 is formed to be cup-shaped by integrating a cylindrical portion and a bottom portion as a single unit. The housing 44 is fixed (for example, glued) to the base 4 with the bottom portion downside. Around the lower edge of the through hole 4h, a thermosetting conductive resin 52 is applied so that the resin is over the base 4 and the housing 44.

The sleeve 46 is a cylindrical component and is fixed (for example, glued) on the inner side surface of the housing 44. A jetty portion 46a, which radially outwardly juts out, is formed at the upper end of the sleeve 46. This jetty portion 46a, in cooperation with the flange 30, limits the motion of the rotor 6 in the axial direction.

The sleeve 46 surrounds the shaft 26. The shaft 26 is a component that extends along the rotational axis R and is attached to the hub 28. The lubricant 48 is injected into several gaps between the rotor 6 and the fixed body 5. Such gaps include a gap between the shaft 26 and the sleeve 46, a gap between the shaft 26 and the housing 44, a gap between the hub 28 and the sleeve 46, a gap between the flange 30 and the sleeve 46, and a gap between the flange 30 and the housing 44.

A first radial dynamic pressure generation groove forming region 54 (hereinafter referred to as first RDG forming region 54) and a second radial dynamic pressure generation groove forming region 56 (hereinafter referred to as second RDG forming region 56), which are vertically separated from each other, are formed on the inner surface of the sleeve 46. The first RDG forming region 54 is formed above the second RDG forming region 56. Radial dynamic pressure generation grooves such as herringbone-shaped grooves or spiral-shaped grooves are formed on each of the first RDG forming region 54 and the second RDG forming region 56. The first RDG forming region 54 is a zonal region surrounding the rotational axis R and is formed so that the region substantially is parallel to the rotational axis R. In that, the first RDG forming region 54 is a cylindrical region the center of which is along the rotational axis R. The second RDG forming region 56 is arranged in the similar manner. The rotor 6 is radially supported by the dynamic pressure generated in the lubricant 48 by the radial dynamic pressure generation grooves formed on the first RDG forming region 54 and the second RDG forming region 56, when the rotor 6 rotates.

A first thrust dynamic pressure generation groove forming region 58 (hereinafter referred to as first TDG forming region 58) is formed on the lower surface of the flange 30 that faces the upper surface of the housing 44. A second thrust dynamic pressure generation groove forming region 60 (hereinafter referred to as second TDG forming region 60) is formed on the upper surface of the flange 30 that faces the lower surface of the jetty portion 46a. Thrust dynamic pressure generation grooves such as herringbone-shaped grooves or spiral-shaped grooves are formed on each of the first TDG forming region 58 and the second TDG forming region 60. The rotor 6 is axially supported by the dynamic pressure generated in the lubricant 48 by the thrust dynamic pressure generation grooves formed on the first TDG forming region 58 and the second TDG forming region 60, when the rotor 6 rotates.

In other embodiments, at least one of the first RDG forming region 54 and the second RDG forming region 56 may be formed on the outer surface of the shaft 26 instead of the inner surface of the sleeve 46. In other embodiments, the first TDG forming region 58 may be formed on the upper surface of the housing 44, and the second TDG forming region 60 may be formed on the lower surface of the jetty portion 46a.

Gas-liquid interface 48a of the lubricant 48 exists in a gap between the outer surface of the housing 44 and the inner surface of the flange 30. In particular, the gap forms a capillary seal, where the gap gradually widens downward. The capillary seal functions as a reservoir for the lubricant 48 for absorbing the change in volume of the lubricant 48, while the capillary seal prevents the leakage of the lubricant 48 by way of the capillary effect.

Relationship among the screw 38 for affixing the disk, the screw hole 26b for affixing the disk and the RDG forming regions will be described below. A space "inside" the RDG forming regions is a space closer to the rotational axis R than the cylindrical RDG forming regions. Alternatively, the space inside the RDG forming regions may be regarded as a space inside a virtual cylinder the side surface of which is the RDG forming regions.

The screw hole 26b for affixing the disk starts from the upper surface 26a of the shaft 26, goes downward along the rotational axis R, passes through the space inside the first RDG forming region 54, and stops in the space inside the second RDG forming region 56. In that, the bottom portion 26ba of the screw hole 26b for affixing the disk is positioned in the space inside the second RDG forming region 56.

The screw hole 26b for affixing the disk is formed such that a diameter D1 of a first part 26bb of the screw hole 26b which overlaps, in the axial direction, with the surface of the shaft hole 28c is less than a diameter D2 of a second part 26bc of the screw hole 26b which overlaps, in the axial direction, with the first RDG forming region 54. Here, the diameters D1, D2 of the screw hole represent inner diameters of female screws. The inner diameter of the female screw is a diameter of a virtual hollow cylinder that is tangent to tops of thread ridges. With regard to minor diameter and pitch diameter, the minor diameter and the pitch diameter of the first part 26bb are less than the minor diameter and the pitch diameter of the second part 26bc, respectively, as in the inner diameter. The lower end surface 38a of the screw 38 for affixing the disk is positioned in the space inside the first RDG forming region 54.

The screw hole 26b for affixing the disk is formed in the following steps. In the first step, a straight screw hole with the diameter D2 is formed. In the second step, a part of the shaft 26 corresponding to the first part 26bb is inwardly compressed or an inward force is applied to the part from the outer surface. For example, the first part 26bb can be formed by press-fitting the shaft 26 into the shaft hole 28c the inner diameter of which is less than the outer diameter of the shaft 26. In particular, thinning the wall thickness of the part of the shaft 26 corresponding to the first part 26bb may facilitate the formation of the first part 26bb. In FIG. 2, the difference between the diameter D1 and the diameter D2 is shown exaggerated. In one embodiment, the diameter D2 is 1.400 mm. The diameter D1 ranges from 1.390 mm to 1.398 mm. The difference between them ranges from 2 μm to 10 μm (in ratio, the diameter D1 is less than the diameter D2 by 0.14 percent to 0.71 percent).

Figure 3:
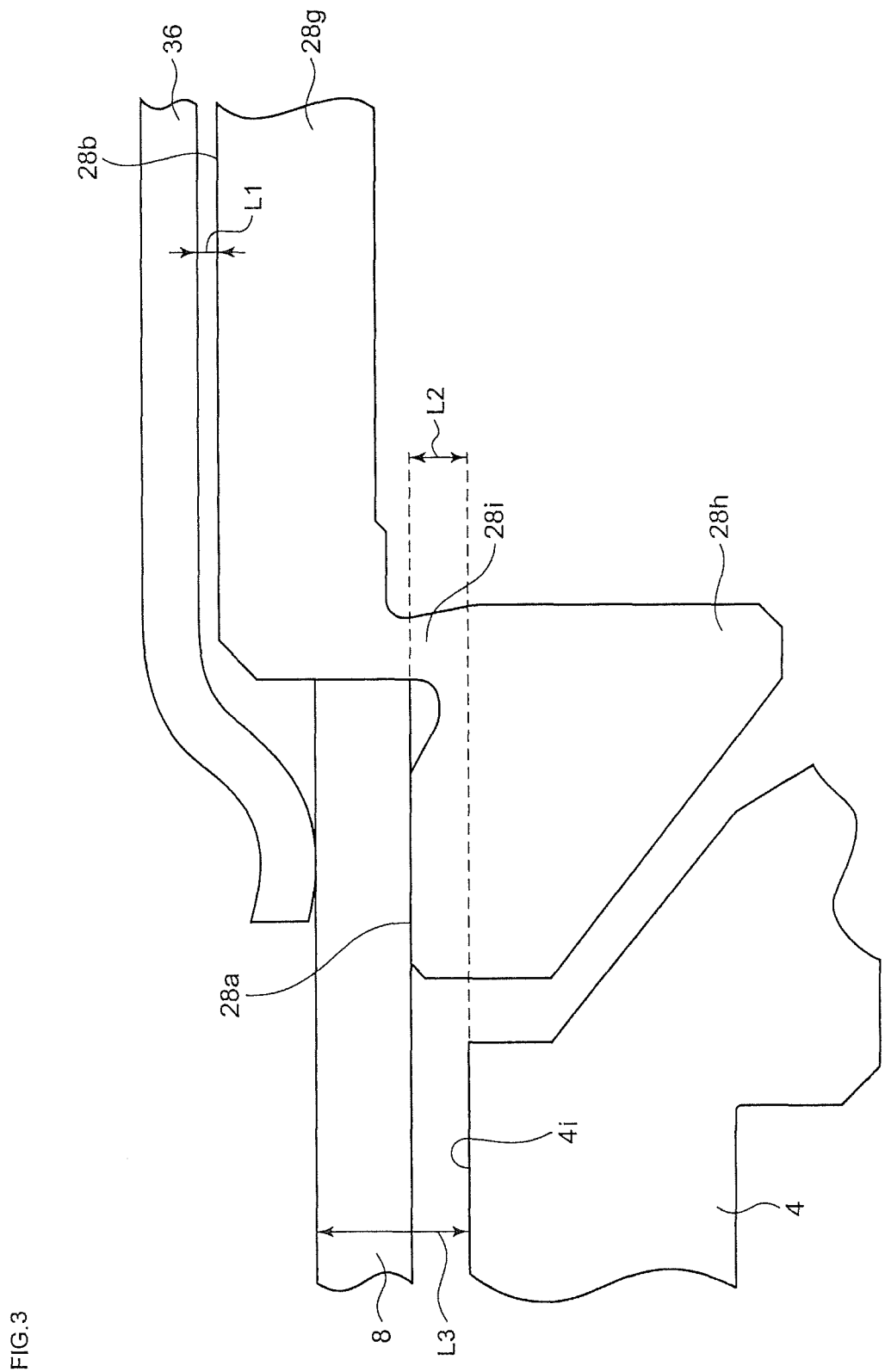
FIG. 3 is a partial section view that shows a vicinity of a disk-mount surface before a clamper is screwed against a projecting portion.

FIG. 3 is a partial section view that shows a vicinity of the disk-mount surface 28a before the clamper 36 is screwed against the projecting portion 28g. In the state shown in FIG. 3, the magnetic recording disk 8 is in between the clamper 36 and the seating portion 28h, and the screw 38 for affixing the disk is not screwed down into the screw hole 26b for affixing the disk. In other words, the hub 28 and the magnetic recording disk 8 and the clamper 36 are fixed to one another with forces that do not induce any deformation of these components.

The lower surface of the magnetic recording disk 8 touches the disk-mount surface 28a. The outer portion of the clamper 36 touches the upper surface of the magnetic recording disk 8. A gap exists between the lower surface of the clamper 36 and the upper surface 28b of the projecting portion 28g. The separation of the gap is denoted as L1.

Hereinafter, a position, in the axial direction, of the seating portion 28h with respect to the projecting portion 28g is called a seating portion position. The seating portion position is represented by a position, in the axial direction, of the disk-mount surface 28a with respect to the upper surface 28b of the projecting portion 28g. The distance, in the axial direction, between the disk-mount surface 28a and the upper surface 4i of a part of the base 4 which faces the magnetic recording disk 8 in the state shown in FIG. 3 is denoted as L2.

Hereinafter, it is provided that the upper surface 4i of the base 4 is a reference surface of the base 4, the reference surface being for determining the position, in the axial direction, of the recording surface or the upper surface of the magnetic recording disk 8 during rotation. The disk height is defined as a distance between the upper surface of the magnetic recording disk 8 during rotation and the upper surface 4i of the base 4. The disk height is obtained by adding a floating height to a distance L3 between the upper surface of the magnetic recording disk 8 in a stationary state and the upper surface 4i of the base 4.

Figure 4:
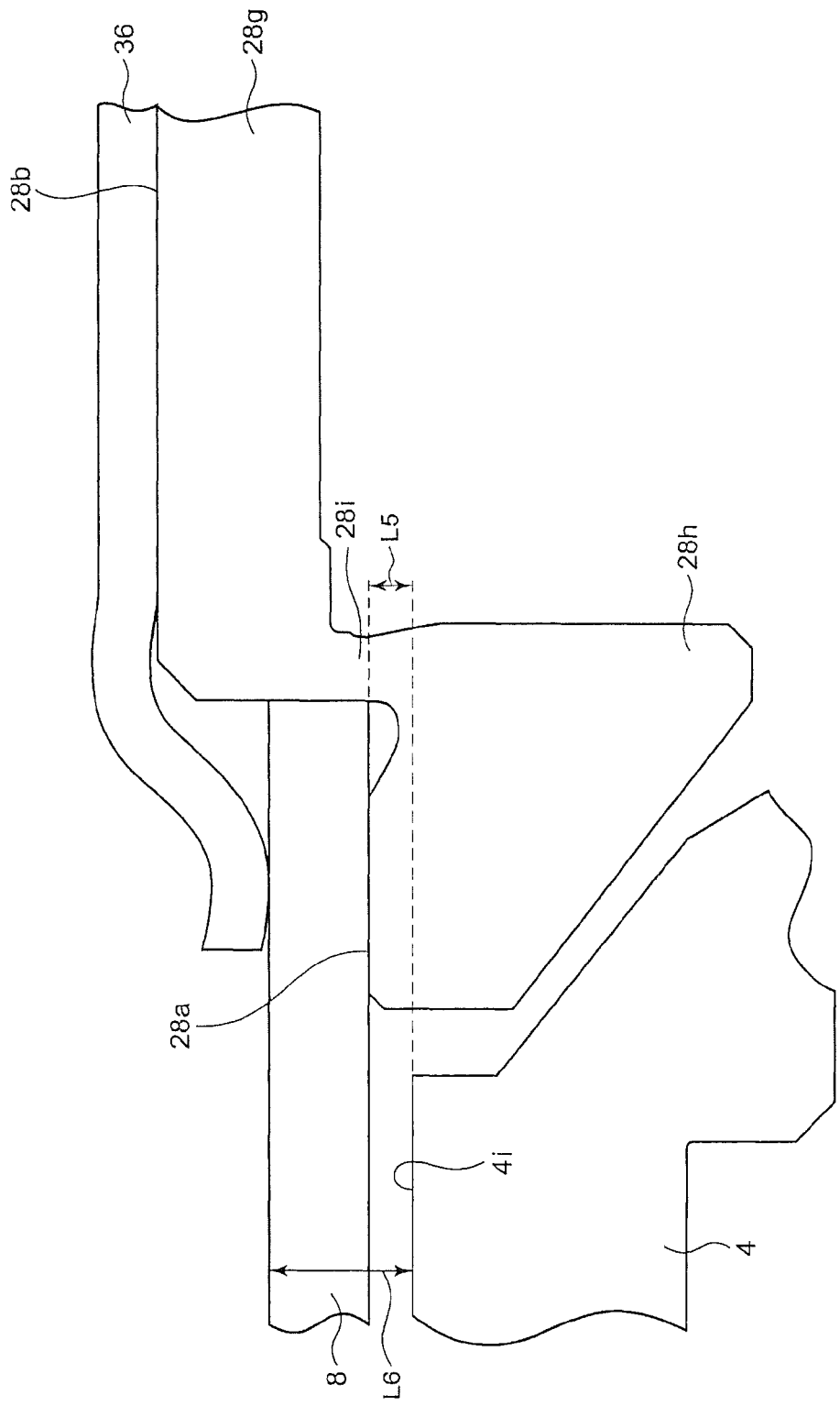
FIG. 4 is a partial section view that shows a vicinity of a disk-mount surface after a clamper is screwed against a projecting portion.

FIG. 4 is a partial section view that shows a vicinity of the disk-mount surface 28a after the clamper 36 is screwed against the projecting portion 28g. By tightening the screw 38 for affixing the disk (as shown in FIG. 3) with a predetermined torque, the clamper 36 is pressed against the projecting portion 28g. The magnitude of the torque for tightening the screw 38 for affixing the disk may be determined according to, for example, standards. For example, the magnitude of the torque may range from 0.1 Nm to 0.2 Nm. In the state shown in FIG. 4, the clamper 36 is fixed to the projecting portion 28g using screw with the magnetic recording disk 8 being in between the clamper 36 and the seating portion 28h. The inner portion of the clamper 36 is pressed against the projecting portion 28g, and the outer portion of the clamper 36 deforms due to a reaction force applied by the magnetic recording disk 8. In particular, the outer portion of the clamper 36 bends.

The seating portion 28h moves downward with respect to the center of the projecting portion 28g under the influence of a downward force applied by the outer portion of clamper 36 via the magnetic recording disk 8. In particular, the seating portion 28h substantially makes a downward translational motion with respect to the center of the projecting portion 28g. The distance L5, in the axial direction, between the disk-mount surface 28a and the upper surface 4i of the base 4 in the state shown in FIG. 4 is less than the distance L2 in the state shown in FIG. 3. The difference Diff between the distance L5 and the distance L2 (Diff=L2−L5) may range from 15 μm to 35 μm in order to be practically usable.

In one example, the motion of the seating portion 28h with respect to the center of the projecting portion 28g can be realized by the fact that apart of the projecting portion 28g where the wall thickness in the axial direction is small bends in the axial direction. In another example, the motion can be realized by the fact that the narrow part 28i positioned around the boundary between the projecting portion 28g and the seating portion 28h extends.

In the present embodiment, the clamper 36 is made of a material harder than the hub 28. Such material includes a high-tensile steel plate. The projecting portion 28g is formed relatively thin in the axial direction. Alternatively, the narrow part 28i may be formed thin.

In the state shown in FIG. 4, the magnetic recording disk 8 is closer to the base 4 than in the state shown in FIG. 3. In that, the distance L6 between the upper surface of the magnetic recording disk 8 in a stationary state and the upper surface 4i of the base 4 in the state shown in FIG. 4 is less than the distance L3 between the upper surface of the magnetic recording disk 8 in a stationary state and the upper surface 4i of the base 4 in the state shown in FIG. 3. In the case where a value obtained by subtracting a floating height during rotation from a desired disk height, which is determined in consideration of the position, in the axial direction, of the magnetic recording head is called a desired distance, the difference between the distance L6 and the desired distance is less than the difference between the distance L3 and the desired distance. In that, the difference between the desired disk height and the disk height related to the state shown in FIG. 4 is less than the difference between the desired disk height and the disk height related to the state shown in FIG. 3. In FIGS. 3 and 4, the deformation is shown exaggerated.

Figure 5:
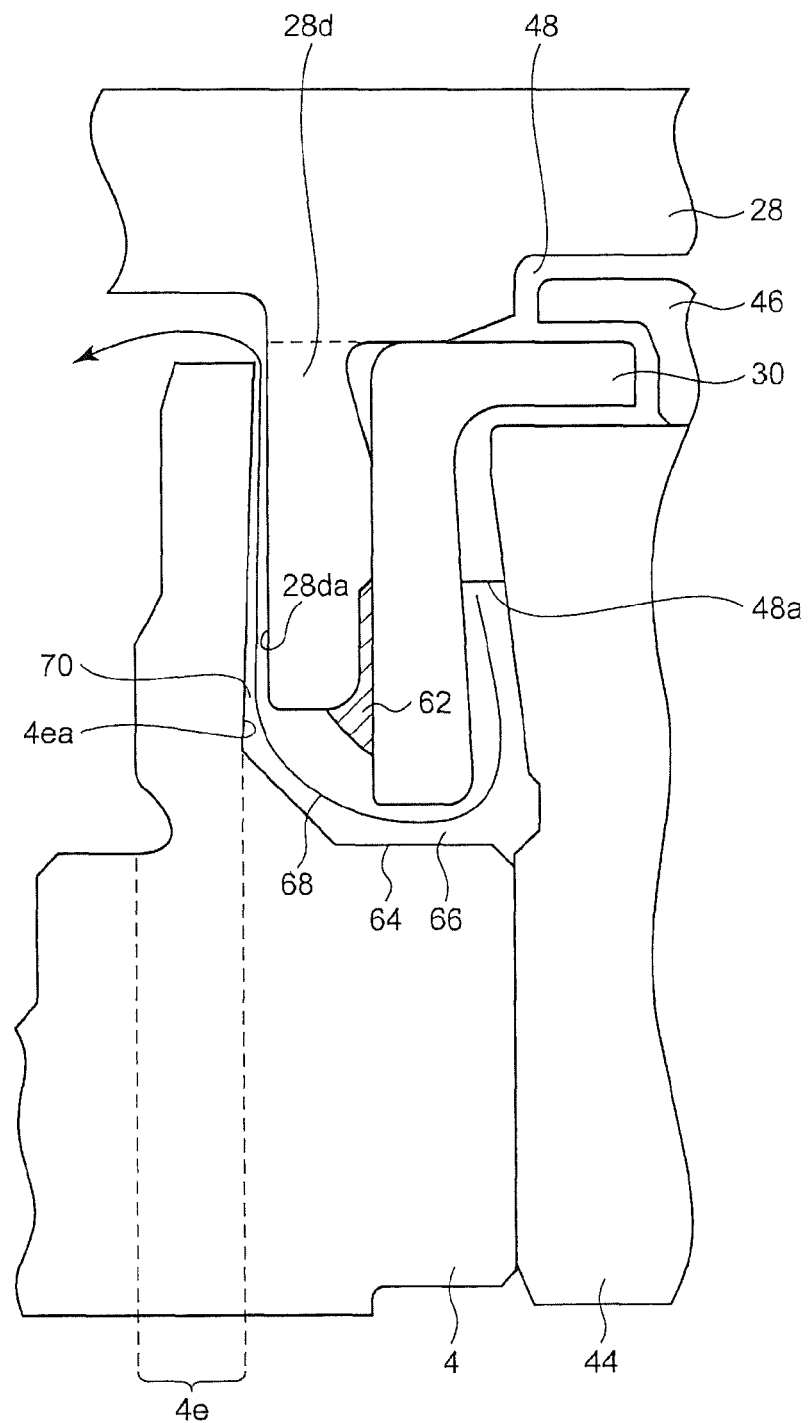
FIG. 5 is a partial section view that shows a vicinity of a gap between a hanging portion and a ring-shaped wall.

Thinner arrangement of the disk drive device may decrease a distance, in the axial direction, of a path of lubricant 48 that evaporates from the gas-liquid interface 48a. This may cause increase of the rate of evaporation of the lubricant 48 from the gas-liquid interface 48a. In addition, in general, thinner arrangement of the disk drive device may decrease the total amount of the stored lubricant 48. In this case, it is more preferable to suppress the evaporation of the lubricant 48 from the gas-liquid interface 48a. FIG. 5 is a partial section view that shows a vicinity of a gap between the hanging portion 28d and a ring-shaped wall 4e. The ring-shaped wall 4e and a part of the base 4 inside the ring-shaped wall 4e and the housing 44 form a ring-like concave portion 64 into which the hanging portion 28d and the flange 30 enter. A gap 66 between the ring-like concave portion 64 and an assembly including the hanging portion 28d and the flange 30 has one part which is filled with the lubricant 48 and the other part which is not filled with the lubricant 48. The other part of the gap 66 forms a path 68 of lubricant 48 evaporating from the gas-liquid interface 48a.

Apart of the path 68 on the exit side or the gap 70 where the hanging portion 28d radially faces the ring-shaped wall 4e is formed such that the more distant along the path 68 a position in the part is from the gas-liquid interface 48a, the narrower the part at the position is. In particular, the outer surface 28da of the hanging portion 28d is formed substantially parallel to the rotational axis R. The inner surface 4ea of the ring-shaped wall 4e is formed such that the closer a position in the inner surface 4ea is to the upper edge of the inner surface 4ea, the less the diameter of the inner surface 4ea at the position is. In the present embodiment, a taper of 0.4 degree is provided to the inner surface 4ea of the ring-shaped wall 4e. The gap 70 is formed so that the width at the lower end (closer to the gas-liquid interface 48a) is 0.5 mm and the width at the upper end (or the exit-side end) is 10 μm. The distance, in the axial direction, between the lower end and the upper end is 1.5 mm. The rate of decrease of the width is about 2 percent. Increase of the taper angle may improve the suppression of the evaporation of the lubricant 48; however, such increase of the taper angle may be limited under the condition that the hanging portion 28*d* does not touch the ring-shaped wall 4*e* when the rotor is mounted to the fixed body. In this case, the gap 70 functions as a labyrinth seal with respect to the lubricant 48 evaporating from the gas-liquid interface 48*a* and contributes to reduction of the rate of evaporation of the lubricant 48. In other embodiments, the gap 70 may be formed such that the length of the gap 70 is over five times larger than the average width of the gap 70.

The operation of the disk drive device 1 as described above shall be described below. The three-phase driving current is supplied to the coils 42 to rotate the magnetic recording disk 8. Fluxes are generated along the twelve teeth by making the driving current flow through the coils 42. These fluxes give torque to the cylindrical magnet 32, and the rotor 6 and the magnetic recording disk 8, which is fitted to the rotor 6, rotate. Along with this, the voice coil motor 16 swings the swing arm 14, and the read/write head goes back and forth within the swing range on the magnetic recording disk 8. The read/write head converts magnetic data recorded on the magnetic recording disk 8 to an electrical signal and transmits the electrical signal to a control board (not shown). The read/write head also converts data sent from the control board in a form of an electrical signal to magnetic data and writes the magnetic data on the magnetic recording disk 8.

In the disk drive device 1 according to the present embodiment, the seating portion 28*h* moves with respect to the center of the projecting portion 28*g* by screwing down the clamper 36 to the projecting portion 28*g* with the magnetic recording disk 8 being in between the clamper 36 and the seating portion 28*h*. In that, the seating portion 28*h* moves with respect to the base 4 so that the disk-mount surface 28*a* approaches the upper surface 4*i* of the base 4. This is because the hub 28 is relatively soft or the hub 28 is relatively thin. As a result, an impact applied to the disk drive device 1 is attenuated by the soft hub 28 and the attenuated impact is transmitted to the magnetic recording disk 8. Therefore, it is possible to reduce the adverse effect on read/write property caused by the impact. Also, it is possible to make the hub 28 thinner. This may contribute to thinning of the disk drive device 1. In addition, it is possible to keep the accuracy of the disk height high while thinning of the disk drive device 1 or improvement of the impact resistance is realized.

Thinning of the disk drive device 1 may require shortening of the screw hole for affixing the disk, in general. Shortening of the screw hole for affixing the disk may reduce the strength of coupling between the screw for affixing the disk and the screw hole for affixing the disk. It is preferable to suppress the reduction of the strength of the coupling in order to ensure the impact resistance of the disk drive device 1.

One of the methods for suppressing the reduction of the strength is to make the diameter of the screw hole less than the diameter of the screw. By doing so, the screw is more tightly screwed into the screw hole and the contact area between the screw and the screw hole increases; thereby the strength of the coupling may increase.

However, such a decrease of the diameter of the screw hole may cause undesired expansion of the shaft when the screw is tightened. In particular, expansion of a part of the shaft that corresponds to the RDG forming region is not desired since this may adversely affect the generation of the radial dynamic pressure.

To cope with this, in the disk drive device 1 according to the present embodiment, the screw hole 26*b* for affixing the disk is formed such that the diameter D1 of the first part 26*bb* is less than the diameter D2 of the second part 26*bc*. This may reduce the adverse effect on the generation of the radial dynamic pressure caused by tightening of the screw 38 for affixing the disk while a larger strength of the coupling is realized at the first part 26*bb*.

The Second Embodiment

A disk drive device according to the second embodiment will be described below. As described above, there is a necessity of making the disk drive device smaller or making the recording capacity of the disk drive device larger. However, in the disk drive device 1 according to the first embodiment, there are the clamper 36 and the screw 38 for affixing the disk between the upper end surface of the shaft 26 and the top cover 2. The thickness of the clamper 36 or the screw 38 may be a bottleneck for thinning the disk drive device. In addition, by arranging the disk drive device thinner in the axial direction for miniaturization, a component used for the disk drive device will become thinner in general and the mechanical strength of the device may decrease. For example, if a screw hole for holding a clamper is formed on the shaft in such a situation, the stiffness of the shaft may decrease and the impact resistance may decrease. The disk drive device 100 according to the second embodiment addresses the above concerns. In the disk drive device 100, the clamper is held at the outer surface of the projecting portion. In addition, one end of the shaft is fixed to the base and the other end of the shaft is fixed to the top cover. This may suppress the reduction of the stiffness of a support for the rotor and provide a technique preferably used for increasing the recording capacity.

Figure 6:
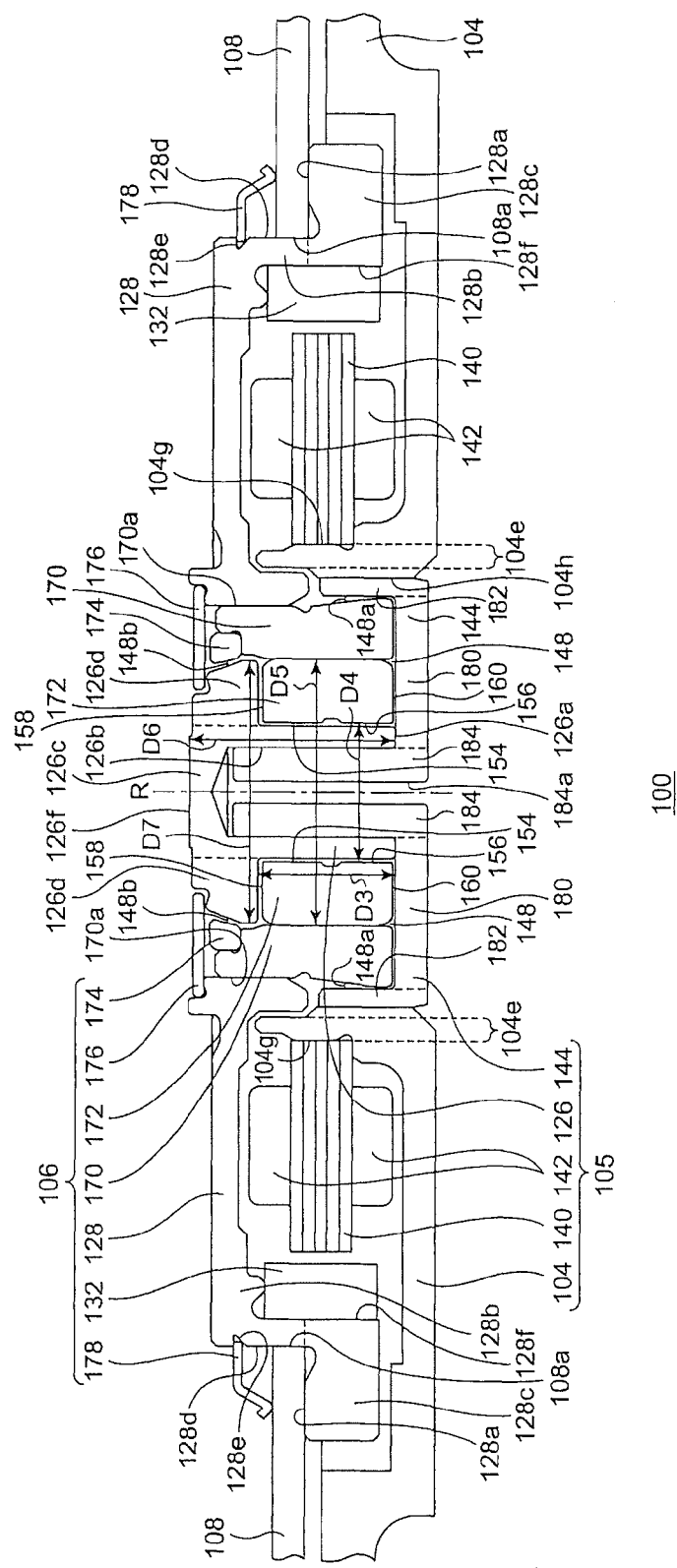
FIG. 6 is a section view of a disk drive device according to a second embodiment.

FIG. 6 is a section view of a disk drive device 100 according to the second embodiment. A top view and a side view of the disk drive device 100 according to the second embodiment are similar to FIGS. 1A and 1B, respectively. The descriptions for FIGS. 1A and 1B are similarly applied to the upper surface and the side surface of the disk drive device 100. The disk drive device 100 comprises a rotor 106 and a fixed body 105 rotatably supporting the rotor 106 through a bearing unit. The magnetic recording disk 108 is mounted on the rotor 106.

The rotor 106 includes a hub 128, a cylindrical magnet 132, an intermediate surrounding portion 170, a shaft surrounding portion 172, a ring portion 174, a cap 176 and a spring washer 178. The fixed body 105 includes a base 104, a laminated core 140, coils 142, a housing 144 and the shaft 126. Lubricant 148 continuously exists in a part of a gap between the fixed body 105 and the rotor 106.

The hub 128 is made of soft-magnetic steel such as SUS430F. The hub 128 is formed to be predetermined cup-like shape by, for example, the press working or cutting of a steel plate. A central hole is formed in the hub 128 along the rotational axis R of the rotor 106. For example, the hub 128 may preferably be made of the stainless steel (DHS1) provided by Daido Steel Co., Ltd. since the stainless steel has lower outgas and is easily-worked. The hub 28 may more preferably be made of the stainless steel (DHS2) provided by Daido Steel Co., Ltd. since the stainless steel has high corrosion resistance.

The hub 128 includes a projecting portion 128*b* configured to fit into a central hole 108*a* of the magnetic recording disk 108 and a seating portion 128*c* provided radially outward of the projecting portion 128*b*. The magnetic recording disk 108 is seated on a disk-mount surface 128*a* which is an upper surface of the seating portion 128h. A ring-like groove 128e, the center of which is along the rotational axis R, is formed on the outer surface 128d of the projecting portion 128b.

An upper end of an inner part of the spring washer 178 touches the hub 128 and a lower end of an outer part directly or indirectly applies force to the upper surface of the magnetic recording disk 108. In the case of direct application of the force, the lower end of the outer part touches the upper surface of the disk 108. The spring washer 178 applies elastic forces to both the hub 128 and the magnetic recording disk 108; thereby pressing the magnetic recording disk 108 against the disk-mount surface 128a of the hub 128. For example, the inner part of the spring washer 178 is arranged in the form of petal and engaged to the ring-like groove 128e. The outer part of the spring washer 178 is pressed against the upper surface of the magnetic recording disk 108. The magnetic recording disk 108 is fixed to the rotor 106 by being in between the spring washer 178 and the seating portion 128c.

The cylindrical magnet 132 is glued on a cylindrical inner surface 128f of the hub 128. The cylindrical magnet 132 is made of a rare-earth material such as Neodymium, Iron, or Boron. The cylindrical magnet 132 faces radially towards twelve teeth of the laminated core 140. The cylindrical magnet 132 is magnetized for driving, with sixteen poles along the circumferential direction. The surface of the cylindrical magnet 132 is treated with electro deposition coating or spray coating to form a film on the surface. The film on the surface suppresses exfoliation of the surface of the magnet 32 or prevents the rust of the surface.

The laminated core 140 has a ring portion and twelve teeth, which extend radially outwardly from the ring portion, and is fixed on the upper surface side of the base 104. The laminated core 140 is formed by laminating five thin magnetic steel sheets and mechanically integrating them. The surface of the laminated core 140 is treated with electro deposition coating or powder coating to form a film on the surface. The film on the surface electrically insulates the surface of the laminated core 140. Each of the coils 142 is wound around one of the teeth of the laminated core 140, respectively. A driving flux is generated along the teeth by applying a three-phase sinusoidal driving current through the coils 142.

The base 104 includes a cylindrical ring-shaped wall 104e the center of which is along the rotational axis R. The ring-shaped wall 104e protrudes toward the hub 128 from the upper surface of the base 104 such that the ring-shaped wall 104e surrounds the housing 144. The laminated core 140 is fitted to the outer surface 104g of the ring-shaped wall 104e with a press-fit or clearance fit and glued thereon.

The housing 144 includes a flat ring portion 180, a cylindrical base-side surrounding portion 182 fixed to an outer part of the flat ring portion 180 and a rod portion 184 fixed to an inner part of the flat ring portion 180. The flat ring portion 180 is coupled to the base-side surrounding portion 182 so that the whole outer surface of the flat ring portion 180 touches a lower part of the inner surface of the base-side surrounding portion 182. The flat ring portion 180 is coupled to the rod portion 184 so that the whole inner surface of the flat ring portion 180 touches a lower part of the outer surface of the rod portion 184. In particular, the flat ring portion 180, the base-side surrounding portion 182 and the rod portion 184 are formed as a single unit. In this case, a manufacturing error of the housing 144 may be reduced and a step of coupling to form the housing 144 may become unnecessary. A through hole 104h is formed in the base 104 along the rotational axis R. The base-side surrounding portion 182 is fixed (for example, glued) in the through hole 104h.

The upper end surface 126f of the shaft 126 is fixed (for example, glued) to the lower surface of the top cover 2. After the shaft 126 is fixed, the top cover 2 is fixed onto the upper surface 4c of the outer circumference wall 4b of the base 4 using six screws 20. A shaft hole 126b is formed in the lower end surface 126a of the shaft 126 along the rotational axis R. The rod portion 184 is inserted into the shaft hole 126b and fixed therein with glue. A rod through hole 184a is formed in the rod portion 184 along the rotational axis R. The shaft 126 includes a shaft body portion 126c extending along the rotational axis R and a body surrounding portion 126d surrounding the upper end of the shaft body portion 126c, the body surrounding portion 126d being fixed to the shaft body portion 126c. The body surrounding portion 126d jets out radially outwardly at the upper side of the shaft 126. The shaft 126 is formed so that an axial dimension D6 of the shaft 126 is less than an outer diameter D7 of the body surrounding portion 126d. The shaft body portion 126c and the body surrounding portion 126d are formed as a single unit. In this case, a manufacturing error of the shaft 126 may be reduced and a step of coupling to form the shaft 126 may become unnecessary.

The shaft surrounding portion 172 surrounds the shaft body portion 126c. The lubricant 148 intervenes between the shaft surrounding portion 172 and the shaft body portion 126c. The shaft surrounding portion 172 is, in the axial direction, in between the body surrounding portion 126d and the flat ring portion 180. The lubricant 148 intervenes between the shaft surrounding portion 172 and the body surrounding portion 126d. The lubricant 148 intervenes between the shaft surrounding portion 172 and the flat ring portion 180. The shaft surrounding portion 172 is formed such that an axial dimension D3 of the shaft surrounding portion 172 is less than a diameter D4 of the inner surface of the shaft surrounding portion 172, the inner surface of the shaft surrounding portion 172 facing the shaft body portion 126c. An axial dimension D6 of the shaft 126 is less than an outer diameter D5 of the shaft surrounding portion 172.

The intermediate surrounding portion 170 surrounds the shaft surrounding portion 172. The hub 128 is fixed to the outer surface 170a of the upper part of the intermediate surrounding portion 170 with glue or press-fit or combination of both. With regard to the positional relationship between the base-side surrounding portion 182 and the intermediate surrounding portion 170, the base-side surrounding portion 182 surrounds a lower part of the intermediate surrounding portion 170.

A gap between the base-side surrounding portion 182 and the intermediate surrounding portion 170 forms a first taper seal, where the gap gradually widens upward. A first gas-liquid interface 148a of the lubricant 148 exists in the first taper seal.

The ring portion 174 is provided at a position radially facing the body surrounding portion 126d, the position corresponding to the upper end of the intermediate surrounding portion 170. The ring portion 174 surrounds the body surrounding portion 126d and is fixed (for example, glued) to the upper part of the intermediate surrounding portion 170. The ring portion 174 is formed separately from the intermediate surrounding portion 170. The ring portion 174 and the intermediate surrounding portion 170 may be formed as a single unit.

A gap between the ring portion 174 and the body surrounding portion 126d forms a second taper seal, where the gap gradually widens upward. A second gas-liquid interface 148b of the lubricant 148 exists in the second taper seal. In particular, the inner surface of the ring portion 174 is formed such that the closer a position in the inner surface is to the upper end surface of the shaft 126, the less the diameter of the inner surface at the position is. The outer surface of the body surrounding portion 126d is formed such that the closer a position in the outer surface is to the upper end surface of the shaft 126, the less the diameter of the outer surface at the position is. The rate of decrease of the diameter of the inner surface of the ring portion 174 is less than the rate of the decrease of the diameter of the outer surface of the body surrounding portion 126d. According to these, the taper shape of the second taper seal is realized. When the rotor 106 rotates, a radially outward force due to a centrifugal force is applied to the lubricant 148 in the second taper seal. Due to the inclination of the inner surface of the ring portion 174, the force acts to suck in the lubricant 148.

The cap 176 is a disk-like component with a central hole, which is fixed at the upper side of the rotor 106 such that the cap 176 at least partly covers the second gas-liquid interface 148b, the ring portion 174 and the body surrounding portion 126d. A gap between the cap 176 and the body surrounding portion 126d forms a labyrinth seal with respect to the lubricant 148.

A first RDG forming region 154 and a second RDG forming region 156, which are vertically separated from each other, are formed on the inner surface of the shaft surrounding portion 172. The first RDG forming region 154 is formed above the second RDG forming region 156. Radial dynamic pressure generation grooves such as herringbone-shaped grooves or spiral-shaped grooves are formed on each of the first RDG forming region 154 and the second RDG forming region 156.

The rotor 106 is radially supported by the dynamic pressure generated in the lubricant 148 by the radial dynamic pressure generation grooves formed on the first RDG forming region 154 and the second RDG forming region 156, when the rotor 106 rotates.

A first TDG forming region 158 is formed on the upper surface of the shaft surrounding portion 172 that faces the lower surface of the body surrounding portion 126d. A second TDG forming region 160 is formed on the lower surface of the shaft surrounding portion 172 that faces the upper surface of the flat ring portion 180. Thrust dynamic pressure generation grooves such as herringbone-shaped grooves or spiral-shaped grooves are formed on each of the first TDG forming region 158 and the second TDG forming region 160. The rotor 106 is axially supported by the dynamic pressure generated in the lubricant 148 by the thrust dynamic pressure generation grooves formed on the first TDG forming region 158 and the second TDG forming region 160, when the rotor 106 rotates.

In other embodiments, at least one of the first RDG forming region 154 and the second RDG forming region 156 may be formed on the outer surface of the shaft body portion 126c instead of the inner surface of the shaft surrounding portion 172. In other embodiments, the first TDG forming region 158 may be formed on the lower surface of the body surrounding portion 126d, and the second TDG forming region 160 may be formed on the upper surface of the flat ring portion 180.

In the disk drive device 100 according to the present embodiment, the magnetic recording disk 108 is fixed by the spring washer 178 that is engaged to the outer surface 128d of the projecting portion 128b. Therefore, the disk drive device 100 may be made thinner than the disk drive device 1 according to the first embodiment by the amount corresponding to the thickness of the clamper 36. In addition, since no screw hole for holding the clamper is made on the shaft, the reduction of the stiffness of the shaft may be suppressed.

The disk drive device 100 according to the present embodiment is arranged so that the conditions D6<D7, D3<D4 and D6<D5 are fulfilled. Therefore, the disk drive device 100 may be made much thinner. In one example, the thickness of the disk drive device 100 is less than or equal to 5 mm.

Above is an explanation for the disk drive devices according to the embodiments. These embodiments are intended to be illustrative only, and it will be obvious to those skilled in the art that various modifications to constituting elements and processes could be developed and that such modifications are also within the scope of the present invention. A combination of the described embodiments is possible.

The first and the second embodiments describe the so-called outer-rotor type of the disk drive device in which the cylindrical magnet is located outside the laminated core. However, the present invention is not limited to this. For example, the technical concept of the first or the second embodiment can be applied to the so-called inner-rotor type of the disk drive device in which the cylindrical magnet is located inside the laminated core.

The first embodiment describes the case where the housing 44 and the sleeve 46 are fixed to the base 4, and the shaft 26 rotates with respect to the base 4. However, the present invention is not limited to this. For example, the technical concept of the first embodiment can be applied to a shaft-fixed type of the disk drive device in which the shaft is fixed to the base, and the bearing unit and the hub rotate together with respect to the shaft. Similarly, the technical concept of the second embodiment may be applied to the shaft-rotating type of the disk drive device.

The first and the second embodiments describe the case where the bearing unit is directly mounted onto the base. However, the present invention is not limited to this. For example, a brushless motor comprising a rotor, a bearing unit, a laminated core, coils, and a base can separately be manufactured, and the manufactured brushless motor can be installed on a chassis.

The embodiment describes the case where the laminated core is used. However, the present invention is not limited to this. The core does not have to be a laminated core.

The first embodiment describes the case where the projecting portion 28g and the seating portion 28h are integrally formed as the hub 28. However, the present invention is not limited to this. For example, the projecting portion may be formed separately from the seating portion. The projecting portion and the seating portion are configured such that the seating portion moves with respect to the projecting portion by screwing down the clamper to the projecting portion with the magnetic recording disk being in between the clamper and the seating portion. In this case, advantages similar to those realized by the disk drive device 1 according to the embodiment can be realized.

The first embodiment describes the case where the clamper 36 is indirectly screwed down to the projecting portion 28g by tightening the screw 38 for affixing the disk into the screw hole 26b for affixing the disk provided on the shaft 26. However, the present invention is not limited to this. For example, the clamper may be directly screwed down to the hub by forming the screw hole for affixing the disk on the hub.

The first embodiment describes the case where the seating portion 28h substantially makes a downward translational motion with respect to the projecting portion 28g. However, the present invention is not limited to this. For example, the seating portion 28h may move downward so that the lower end portion of the seating portion 28h is inclined toward inside.

A prominence ratio may be improved in the first and the second embodiments. The magnitude of the noise when the rotor rotates may fluctuate. This fluctuation may be unpleasant to a user. A particular frequency component(s) of the noise when the rotor rotates may be harsh on the ears. This may be unpleasant to a user. The frequency component(s) is 3 PN (P is the number of poles of the cylindrical magnet and N is the number of revolution) component(s) corresponding to the fundamental frequency of so-called torque ripple. In that, vibration of the laminated core may be induced by the torque ripple, and the vibration may be transmitted to the base and may cause the noise. To cope with this, in a disk drive device according to a variant, a laminated core is press-fit to a ring-shaped wall with a resin in between. In that, the resin is in between the laminated core and the ring-shaped wall. For example, the press fit allowance ranges from 30 μm to 100 μm. The thickness of the resin ranges from 25 μm to 45 μm. The press fit width is 1.12 mm.

What is claimed is:

1. A disk drive device, comprising:
a rotor on which a recording disk is to be mounted; and
a fixed body rotatably supporting the rotor through a bearing unit,
wherein the rotor includes:
    a projecting portion configured to fit into a central hole of the recording disk;
    a clamper configured to be fixed to the projecting portion; and
    a seating portion provided radially outward of the projecting portion,
wherein the projecting portion and the seating portion are configured such that the seating portion moves with respect to the projecting portion by fixing the clamper to the projecting portion with the recording disk being in between the clamper and the seating portion, and
wherein, in the case where a position, in an axial direction, of the seating portion with respect to the projecting portion is called a seating portion position, the difference between
    (i) the seating portion position in the case where the clamper is fixed to the projecting portion with the recording disk being in between the clamper and the seating portion, and
    (ii) the seating portion position otherwise
is in the range from 15 μm to 35 μm.

2. The disk drive device according to claim 1, wherein, in the case where a distance, in the axial direction, between a recording surface of the recording disk during rotation and a reference surface of the fixed body is called a disk height, the difference between a desired disk height and the disk height in the case where the clamper is fixed to the projecting portion with the recording disk being in between the clamper and the seating portion is less than the difference between the desired disk height and the disk height otherwise.

3. The disk drive device according to claim 1, wherein the bearing unit includes:
a shaft extending along a rotational axis of the rotor; and
a shaft surrounding portion surrounding one end of the shaft,
wherein lubricant exists in a gap between the shaft and the shaft surrounding portion,
wherein at least one of a surface of the shaft and a surface of the shaft surrounding portion has a groove forming region on which a dynamic pressure generation groove is formed, the surface of the shaft and the surface of the shaft surrounding portion forming the gap and the groove forming region surrounding the rotational axis, and
wherein a hole is formed in the shaft from the other end of the shaft along the rotational axis, the hole being disposed through the inside of the groove forming region.

4. The disk drive device according to claim 1, wherein the bearing unit includes:
a shaft extending along a rotational axis of the rotor, the shaft being fixed to the rotor; and
a shaft surrounding portion surrounding one end of the shaft,
wherein lubricant exists in a gap between the shaft and the shaft surrounding portion,
wherein at least one of a surface of the shaft and a surface of the shaft surrounding portion has a groove forming region on which a dynamic pressure generation groove is formed, the surface of the shaft and the surface of the shaft surrounding portion forming the gap and the groove forming region surrounding the rotational axis,
wherein a screw hole is formed in the shaft from the other end of the shaft along the rotational axis, and
wherein the screw hole is formed such that a diameter of a part of the screw hole which overlaps, in the axial direction, with a contacting portion where the shaft touches the rotor is less than a diameter of another part of the screw hole which overlaps, in the axial direction, with the groove forming region.

5. The disk drive device according to claim 1, wherein the bearing unit includes a fluid dynamic bearing unit,
wherein the rotor includes a ring-like projecting portion projecting toward the fixed body and surrounding the fluid dynamic bearing unit,
wherein the fixed body includes a ring-like concave portion into which the ring-like projecting portion enters,
wherein at least a part of a gap between the ring-like projecting portion and the ring-like concave portion forms a path of lubricant evaporating from a gas-liquid interface, and
wherein the path tapers toward an exit of the path.

6. A disk drive device, comprising:
a rotor on which a recording disk is to be mounted; and
a fixed body rotatably supporting the rotor through a bearing unit,
wherein the rotor includes:
    a projecting portion configured to fit into a central hole of the recording disk; and
    a seating portion provided radially outward of the projecting portion,
wherein the recording disk is fixed to the rotor by being in between a clamper engaged to the outer surface of the projecting portion and the seating portion,
wherein the bearing unit includes a shaft extending along a rotational axis of the rotor, one end of the shaft being fixed to the fixed body,
wherein the shaft has a flange portion extending radially outward of the other end of the shaft, and
wherein the shaft is formed such that an axial dimension of the shaft is less than an outer diameter of the flange portion.

7. The disk drive device according to claim 6, wherein the bearing unit further includes
a shaft surrounding portion surrounding the shaft,
wherein the shaft surrounding portion is formed such that an axial dimension of the shaft surrounding portion is less than a diameter of a surface of the shaft surrounding portion, the surface of the shaft surrounding portion facing the shaft.

8. The disk drive device according to claim 6, wherein the bearing unit further includes
a shaft surrounding portion surrounding the shaft,
wherein the axial dimension of the shaft is less than an outer diameter of the shaft surrounding portion.

9. The disk drive device according to claim 6, wherein the bearing unit further includes a shaft surrounding portion surrounding the shaft,
wherein lubricant intervenes between the shaft and the shaft surrounding portion,
wherein the rotor includes a cover portion covering an gas-liquid interface of the lubricant, and
wherein a gap between the cover portion and the flange portion forms a labyrinth seal with respect to the lubricant.

10. The disk drive device according to claim 6, wherein the bearing unit further includes
a rod portion inserted in a shaft hole which is formed in the shaft along the rotational axis.

11. The disk drive device according to claim 6, wherein the clamper does not intersect with a flat surface including an end surface of the projecting portion.

12. The disk drive device according to claim 6, wherein an engaging portion to engage the clamper is formed on an outer surface of theyrojecting portion.

13. A disk drive device, comprising:
a rotor on which a recording disk is to be mounted; and
a fixed body rotatably supporting the rotor through a bearing unit,
wherein the rotor includes:
a projecting portion configured to fit into a central hole of the recording disk; and
a seating portion provided radially outward of the projecting portion,
wherein the recording disk is fixed to the rotor by being in between a clamper engaged to the outer surface of the projecting portion and the seating portion,
wherein the bearing unit includes:
a shaft extending along a rotational axis of the rotor; and
a shaft surrounding portion surrounding the shaft, and
wherein an axial dimension of the shaft is less than an outer diameter of the shaft surrounding portion.

14. The disk drive device according to claim 13, wherein the shaft surrounding portion is formed such that an axial dimension of the shaft surrounding portion is less than a diameter of a surface of the shaft surrounding portion, the surface of the shaft surrounding portion facing the shaft.

15. The disk drive device according to claim 13, wherein lubricant intervenes between the shaft and the shaft surrounding portion,
wherein the rotor includes a cover portion covering an gas-liquid interface of the lubricant, and
wherein a gap between the cover portion and the flange portion forms a labyrinth seal with respect to the lubricant.

16. The disk drive device according to claim 13, wherein the bearing unit further includes a rod portion inserted in a shaft hole which is formed in the shaft along the rotational axis.

17. The disk drive device according to claim 13, wherein the clamper does not intersect with a flat surface including an end surface of the projecting portion.

18. The disk drive device according to claim 13, wherein an engaging portion to engage the clamper is formed on an outer surface of the projecting portion.

\* \* \* \* \*